No. 786,786. PATENTED APR. 4, 1905.
J. GOULD, Sr.
HOG RINGING IMPLEMENT.
APPLICATION FILED MAY 26, 1904.
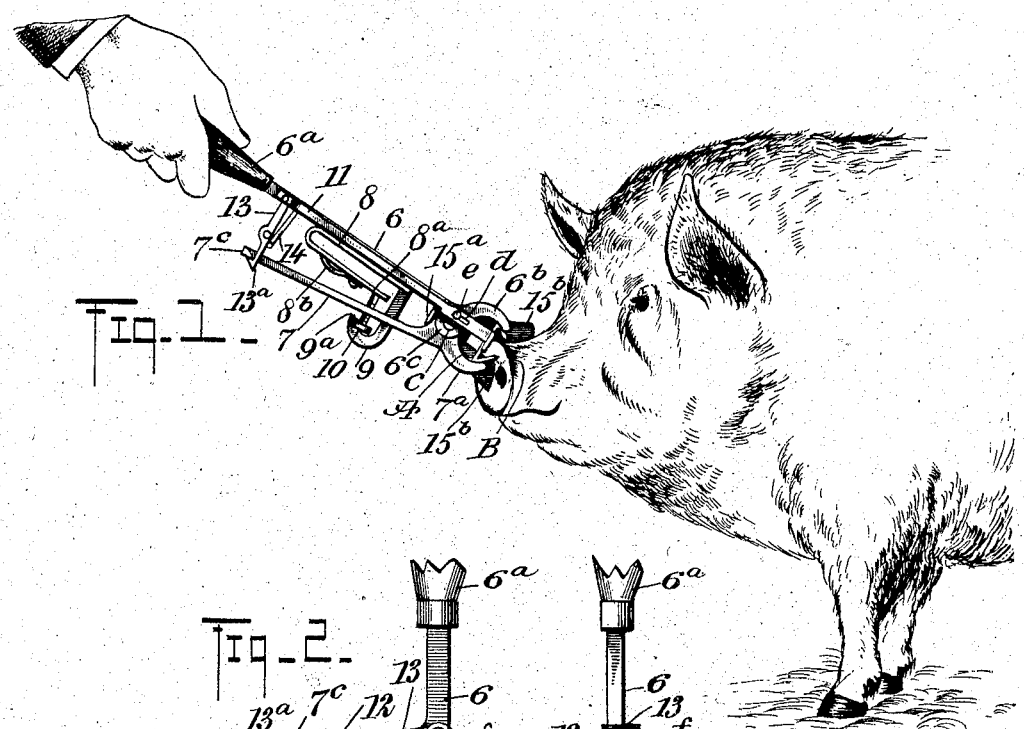
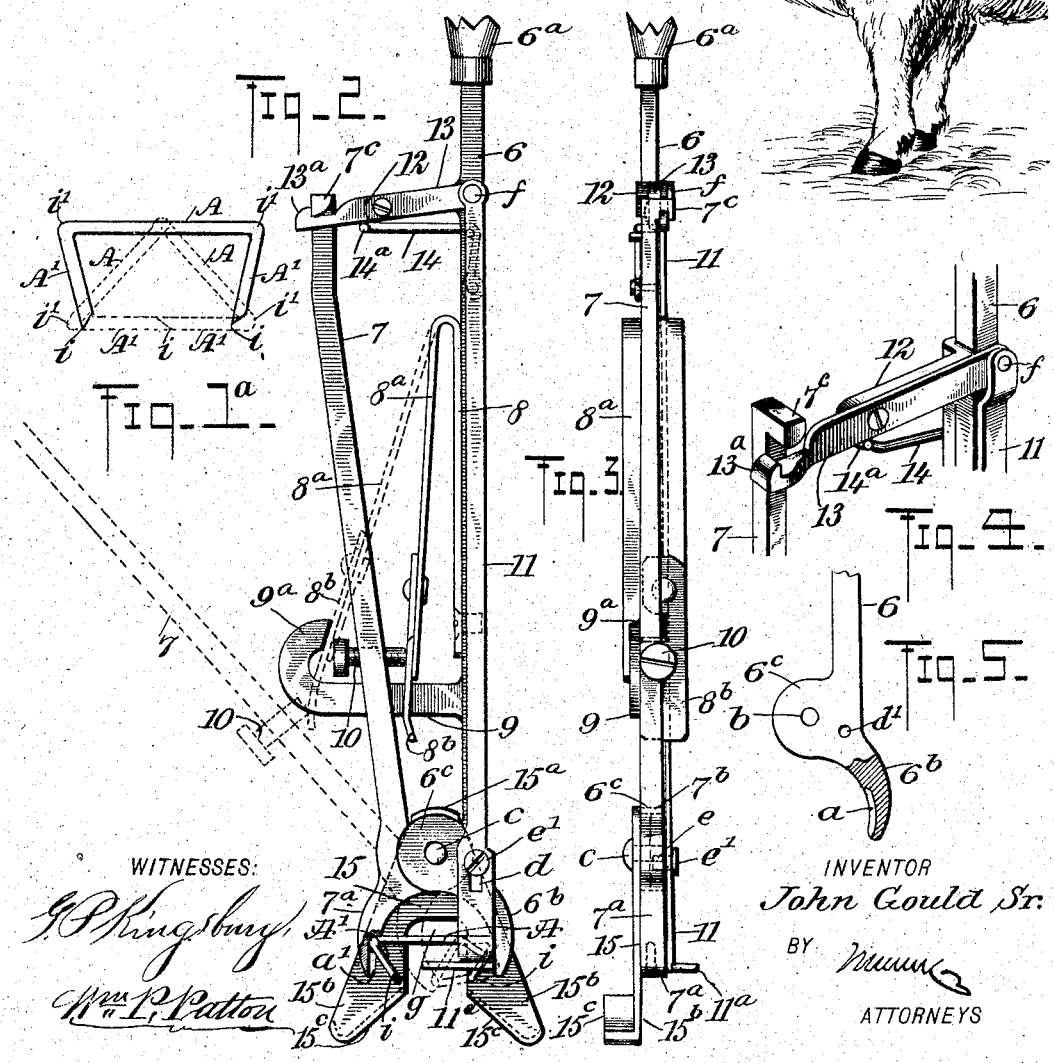
WITNESSES:
INVENTOR
John Gould Sr.
BY
ATTORNEYS No. 786,786.                                                      Patented April 4, 1905.

UNITED STATES PATENT OFFICE.

JOHN GOULD, SR., OF CLINTON, PENNSYLVANIA.

HOG-RINGING IMPLEMENT.

SPECIFICATION forming part of Letters Patent No. 786,786, dated April 4, 1905.

Application filed May 26, 1904. Serial No. 209,822.

*To all whom it may concern:*

Be it known that I, JOHN GOULD, Sr., a citizen of the United States, and a resident of Clinton, in the county of Allegheny and State of Pennsylvania, have invented a new and Improved Hog-Ringing Implement, of which the following is a full, clear, and exact description.

This invention relates to mechanical means for inserting and securing a ring in the snout of a hog to prevent the beast from rooting soil, and has for its object to provide novel features of construction for a hog-ringing implement that are simple, practical, and easily operated and which adapt the tool to automatically close a ring in the rim of the snout when applied thereto.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the implement applied to the snout of a hog for insertion of a ring therein. Fig. 1$^a$ is a side view of the ring to be applied by the implement, showing it open by full lines and the members of the same closed by dotted lines, the closure being effected by the improved implement. Fig. 2 is an enlarged side view of the implement, showing parts thereof set for the compression of a ring, so as to close the spaced pointed ends of the ring, the dotted lines indicating the relative positions of said parts when the ring has been closed automatically by the changed adjustment of the tool. Fig. 3 is an edge view of the implement. Fig. 4 is an enlarged detail view showing a portion of a handled shank, a post thereon, a spring-pressed latch-bar pivoted upon the post, a tripping-bar pivoted by one end on an end of the latch-bar, and an end portion of a jaw-limb whereon the latch-bar may be detachably hooked; and Fig. 5 is a side view of the forward portion of the handle-lever, showing an integral jaw, partly in section, and a joint-leaf on an edge of the handle-bar near the jaw.

An elongated shank 6, formed of metal, preferably rectangular in cross-section and of suitable length, is provided, having a grip piece or handle 6$^a$ at one end and a jaw 6$^b$ at the opposite end. The jaw 6$^b$ is curved somewhat, so as to render its lower surface concave, said surface having a longitudinal channel $a$, formed therein, which extends from the free end of the jaw rearward a proper length for effective use, as will hereinafter be fully described, this construction appearing in Fig. 5.

At the heel of the jaw 6$^b$ a joint-leaf 6$^c$ is formed on the handled shank 6 and extends below the concave face of the jaw, this leaf having a central perforation therein, as shown at $b$ in Fig. 5. A mating jaw 7$^a$ is formed on the forward end of an elongated limb 7, said jaw having a concaved side opposed to the concavity in the jaw 6$^b$, and adjacent to the jaw 7$^a$ a joint-leaf 7$^b$ is formed on the limb 7, which has lapped contact with a side of the leaf 6$^c$ and is centrally perforated to receive the pivot-bolt $c$, that passes through the registering perforations in the lapped leaves, as indicated in Fig. 2. In the concaved surface of the jaw 7$^a$ a channel $a'$ is formed of a length equal to that of the channel $a$ and similar in other respects thereto, said channel extending from the outer end of the jaw toward the joint-leaf 7$^b$, so that the channels $a$ and $a'$ are directly opposite each other.

To dispose the jaws 7$^a$ 6$^b$ in the same plane, the joint-leaves thereon are reduced in thickness by forming open recesses, each removing one-half the thickness of a respective leaf, this construction and arrangement of parts disposing the limb 7 and the shank 6 in the same plane with the jaws considered laterally. The relative arrangement of the jaws 7$^a$ 6$^b$ on the limb 7 and the shank 6 is such that they will be diverged from each other a maximum distance when the limb is folded toward the shank as far as is permitted by a spring 8, that is located between said parts. The spring 8 is in the form of an essentially U-shaped plate-metal strip, one limb of which is secured upon the side of the lever-bar 6 nearest to and opposite the upper surface of the limb 7, said spring having the free ends thereof projected toward the hinged joint-leaves $6^a$ $7^b$ and the bowed end toward the handle $6^a$.

An abutment-arm 9 is extended from one side of the shank 6 at a suitable point between the pivot-bolt $c$ and the free ends of the spring 8, said arm at its lower end curving edgewise, so as to produce an upturned member $9^a$ thereon, upon which the lower leg $8^a$ of the spring is impinged when said spring is in an uncompressed condition, this contact serving to control the divergence of the lower spring member from the upper one, as is indicated by dotted lines in Fig. 2.

In a threaded perforation in the jaw-limb 7 a set-screw bolt 10 is screwed and may be adjusted toward and from the lower member or leg $8^a$ of the spring 8, and upon said leg, near the free end thereof, a wear-plate $8^b$ is pivoted near one of its ends, and the other end of the wear-plate, which projects toward the pivot-bolt $c$, is curved downward near said end, whereby it is adapted to have contact with the end of the set-screw bolt 10, as is indicated by dotted lines in Fig. 2. At the end of the jaw-limb 7, projected near the handle $6^a$, a hook member $7^c$ is formed, which projects laterally therefrom at the side of said limb opposite the side thereof which loosely contacts with the side of the abutment-arm 9, and the upper side of the hook member is convexed to adapt it for service.

A tripping-bar 11, shaped laterally to permit it to lie closely against one side of the shank 6, is longitudinally slotted, as at $d$, near its end that in service is located at the outer side of the jaw $6^b$, as shown in Fig. 2. The tripping-bar 11 is held to slide a limited distance by the stud-bolt $e$, having a head $e'$ thereon, said stud-bolt being inserted through the slot $d$ and screwed into a threaded perforation $d'$, (shown in Fig. 5,) the head of the bolt preventing an outward displacement of the tripping-bar.

A post 12 is extended from the shank 6 toward the latch-hook $7^c$, and upon the side of the post nearest the tripping-bar 11 a hook-bar 13 is pivoted near the center of said bar. The upper end of the hook-bar 13 is pivoted upon the adjacent end of the tripping-bar 11, as is indicated at $f$ in Fig. 2, so that a sliding movement of the latter will rock the hook-bar. The outer end of the hook-bar 13 is provided with a latch-hook $13^a$, shaped to readily engage with and lock fast to the latch-hook $7^c$ when the jaw-limb 7 is depressed against the stress of the spring 8.

A finger-spring 14 is secured by its upper portion upon the shank 6, and thence projects downward at the side of the hook-bar 13, opposite the side on which the hook $13^a$ is formed, and on the lower end of the finger-spring a lateral extension $14^a$ is formed that presses upon said side of the hook-bar, whereby the hook $13^a$ is normally held pressed toward the handle $6^a$ of the shank 6, this rocking adjustment of the hook-bar being limited by the contact of the rear end of the slot $d$ upon the screw-stud $e$.

A lateral pressure-arm $11^a$ (see Figs. 2 and 3) is formed or secured upon the end of the tripping-bar 11, that is lapped upon the side of the jaw $6^b$, said arm being thickened outwardly from the body of the bar to give it necessary strength, as shown in Fig. 3, said arm projecting part way across the gap between the jaws $7^a$ $6^b$, and is thus adapted for contact upon an object introduced between said jaws.

A yoke-plate 15 is pivoted upon the outer side of the limb 7 or the jaw thereon, farthest from the tripping-bar 11 by the same pivot-bolt $c$ that holds the jaws $7^a$ $6^b$ together, and the rocking movement of the yoke-plate is limited by a lateral flange $15^a$, that projects from the end of the plate 15 nearest the arm 9 and is located near the joint-leaves on the limb and shank, said flange at its ends having a slight clearance from the inner sides of the limb 7 and shank 6 when the limb 7 is hooked upon the hook-bar 13. The yoke-plate is substantially triangular in contour, having one edge at the front of the jaws $7^a$ $6^b$, and a slot or opening $g$ is formed in the yoke-plate from said edge thereof, thus producing an opening of a suitable width and depth in the yoke-plate opposite the gap between the jaws $7^a$ $6^b$. The slot or opening $g$ provides two spaced members $15^b$ on the yoke-plate 15, that at their free ends are sloped on the edges, so as to give them equal inclination toward the rear of the slot or opening $g$. On the sloped free edges of the yoke members $15^b$ similar flanges $15^c$ are projected laterally therefrom and away from the jaws $7^a$ $6^b$, in advance of which they respectively extend.
The lateral flanges serve as guides for contact with the muscular rim of a hog's snout B and locate the jaws $7^a$ $6^b$ at proper points thereon when the implement is applied for service.

The rings that are to be secured in the snouts of hogs by the use of the improved implement are alike and before application are shaped, essentially, as shown in Fig. 1, $1^a$, and 2, each consisting of a wire rod cut sloping on the ends $i$ and bent at two acute angles $i'$ an equal distance from said ends, thus producing two short limbs $A'$ on a longer member $A$ of said open angular ring, the limbs $A'$ being separated sufficiently at their ends to permit them to embrace the circular rim-like cartilage B of the nose or snout of a hog.

Preparatory to the operation of affixing a wire ring in the snout of an animal the implement is adjusted as shown in Figs. 1 and 2 by full lines. To effect this adjustment, the screw-bolt 10 is screwed through the jaw-limb 7, so as to project its end for a proper contact with the wear-plate 8ᵇ, that is extended in advance of the spring member 8ᵃ, upon which it is pivoted. The jaw-limb 7 is now pressed toward the shank 6, thus forcibly impinging the point of the screw 10 upon the upper member 8ᵃ of the plate-spring 8, this pressure permitting the hook 7ᶜ to engage with the latch-hook 13ᵃ at the lower end of the hook-bar 13, this hooked engagement being enforced by the tension of the finger-spring 14, that presses the latch-hook rearwardly, this hooked connection causing the tripping-bar 11 to slide forwardly a distance limited by the contact of the stud-bolt e upon the rear end of the slot d. The jaws 7ᵃ 6ᵇ are now diverged a distance controlled by the set of the screw 10, as its projection more or less at the inner side of the jaw-limb 7 will define the degree of compression given to the spring 8, the length of the hook-bar 13 also coacting to control the spreading apart of said jaws. The distance between the bottoms of the channels a a' in the jaws 7ᵃ 6ᵇ when the latter are spread apart fully is just sufficient to permit one of the open rings to be pressed therein, the angles i' on the rings occupying the channels. It will be seen that the limbs A' of the open ring that has been placed between the jaws of the implement have their points i projected forwardly, and these points are so diverged that they may be passed over the upper edge of the snout B of a hog between the nostrils, this engagement appearing in Fig. 1. From their relative location and arrangement the flanges 15ᶜ on the yoke-plate 15 are of considerable advantage in guiding the jaws 7ᵃ 6ᵇ into proper position centrally on the snout B of a hog. The pressure-arm 11ᵃ is now in loose contact with the front surface of the snout B centrally between the nostrils of the beast, and said arm by its position on the snout indicates whether the ring is properly disposed thereon. It is not at all times necessary to hold the animal, as the animal may be induced to remain stationary by feeding it or by other means.

The operation of applying a ring is as follows: A quick pressure of the arm 11ᵃ upon the snout B will slide the tripping-arm 11 rearward and rock the hook-bar 13, so as to detach the latch-hook 13ᵃ from the hook 7ᶜ, thus releasing the rear end of the jaw-limb 7. The spring 8 instantly resumes its normal condition, throwing the limb 7 downward, the end portion of the spring member 8ᵃ being checked from too great a divergence by its impingement upon the member 9ᵃ of the abutment-arm 9, as is indicated by dotted lines in Fig. 2. The forcible and instant downward rocking movement of the jaw-limb 7 correspondingly rocks the jaw 7ᵃ toward the jaw 6ᵇ and of course bends the open ring, so that the points i on the limbs A' are forced toward each other and into the rim portion of the snout B wherein the ring is thus non-removably secured, the operation being automatic and instantaneous.

Having thus described my invention, I claim as new and desire to secure by Letters Patent—

1. An implement for ringing hogs, embodying a limb, an elongated shank lapped and pivoted upon the limb, mating jaws on like ends of the limb and shank and adapted to hold an open ring between them, a spring between the limb and shank, normally spreading them apart and partly closing the jaws, means for holding the limb and shank pressed toward each other against the stress of the spring, and means for releasing the limb from the shank to permit closure of the jaws.

2. An implement for ringing hogs, embodying a limb, an elongated shank lapped and pivoted upon the limb near like ends of the same, jaws on the ends of the limb and shank near their pivot connection, said jaws having concave inner faces, and a channel in each concave face for the reception of an open wire ring, a plate-spring having two divergent members and held between the limb and shank, releasable means for holding the limb pressed toward the shank so as to spread apart the jaws against the stress of the spring, and means for releasing the limb when said means is pressed upon the snout of an animal which is to be engaged by the ring held between the jaws.

3. An implement for ringing hogs, comprising an elongated shank, an elongated limb, the limb and shank being lapped together and pivoted where they lap, jaws on the ends of the limb and shank near their jointed connection, said jaws having concave inner faces and channels in said faces extended from the free ends of the jaws, said channels being adapted to receive an open wire ring, a looped plate-spring secured by one member on the inner side of the shank, an adjustable screw in the limb, adapted to contact with a wear-plate on the other member of said spring, for compression of said spring when the limb is pressed toward the shank, a hook on the rear end of the limb, a post on the shank near said hook, a hook-bar pivoted between its ends on the post, and having a latch-hook on the lower end adapted to engage the hook on the limb, and means for rocking the hook-bar to release the latch-hook from the hook on the limb when said means is forcibly pressed on the snout of an animal to be ringed.

4. In an implement of the character described, the combination with two lapped and pivoted elongated bars, a jaw on each bar near the pivot connection, said jaws having opposed concave faces and a hook on the opposite end of one bar, of a post on the other bar near said hook, a hook-bar pivoted between its ends on the post and having a hook adapted to engage the other hook, a spring between the two bars, normally spreading them apart for the closure of the jaws, said spring being compressed when the hook-bar engages with the mating hook on the hinged bar, a screw in said hinged bar, adapted for pressure on the spring to compress it, an abutment-arm having a member opposing the spring to restrict its expansion, and a tripping-bar held to slide on one elongated bar, said tripping-bar being pivoted at one end upon the upper end of the hook-bar, and at the opposite end having a pressure-arm for contact with the snout of an animal whereby to release the hook-bar and permit a closure of the jaws.

5. In an implement of the character described, the combination with an elongated limb having a concave-faced jaw on one end and a hook on the other end, an elongated shank lapped and pivoted on the limb, a jaw on the shank near the pivot and having a similar concave face, said concave faces having like longitudinal channels therein, and a yoke-plate secured on one jaw, having an open slot opposite the space between the jaws, of a post on the shank near the hook on the end of the limb, a hook-bar pivoted between its ends on said post, a latch-hook on the lower end of the hook-bar, adapted to engage the hook on the limb, a finger-spring pressing upon the hook-bar, a spring normally spreading the limb and shank apart, means for restricting the expansion of said spring, and a tripping-bar held to slide on the shank, one end of said bar having a pressure-arm thereon for contact with the snout of an animal, the other end thereof being pivoted upon the upper end of the hook-bar.

In testimony whereof I have signed my name to this specification in the presence of two subscribing witnesses.

JOHN GOULD, Sr.

Witnesses:
   E. J. McCullough,
   R. H. Adams.